United States Patent [19]
Kaiho

[11] Patent Number: 5,355,353
[45] Date of Patent: Oct. 11, 1994

[54] DATA RECORDING SYSTEM OF MAGNETO-OPTIC TYPE

[75] Inventor: Yu Kaiho, Tachikawa, Japan

[73] Assignee: Binet Co., Ltd., Japan

[21] Appl. No.: 885,779

[22] Filed: May 20, 1992

[30] Foreign Application Priority Data

Jun. 27, 1991 [JP] Japan ................................ 3-183160

[51] Int. Cl.⁵ .......................................... G11B 11/10
[52] U.S. Cl. ........................................ 369/13; 369/32
[58] Field of Search .................. 369/13, 32; 360/59, 360/114

[56] References Cited

U.S. PATENT DOCUMENTS

| | | | |
|---|---|---|---|
| 5,122,886 | 6/1992 | Tanaka | 369/32 X |
| 5,142,521 | 8/1992 | Terashima et al. | 369/32 X |
| 5,153,861 | 10/1992 | Maeda et al. | 369/32 |
| 5,214,626 | 5/1993 | Satoh et al. | 369/32 |
| 5,274,617 | 12/1993 | Terashima et al. | 369/32 X |

Primary Examiner—Tony M. Argenbright
Attorney, Agent, or Firm—Lorusso & Loud

[57] ABSTRACT

Analog signals of multiple channels received by a terminal are passed through a filter, converted into digital signals by an A/D converter, and are stored temporarily on a RAM. The digital signals are then stored in a recording data section at a particular sector of a magneto-optic disk, while recording an ID number, real-time information on time to start and end recording, event information, trigger information, and so on in a condition data section at the identical particular sector as an index of a search. Upon the search for data, only the condition data section is searched for, thereby permitting a random access and search at a high speed.

6 Claims, 17 Drawing Sheets

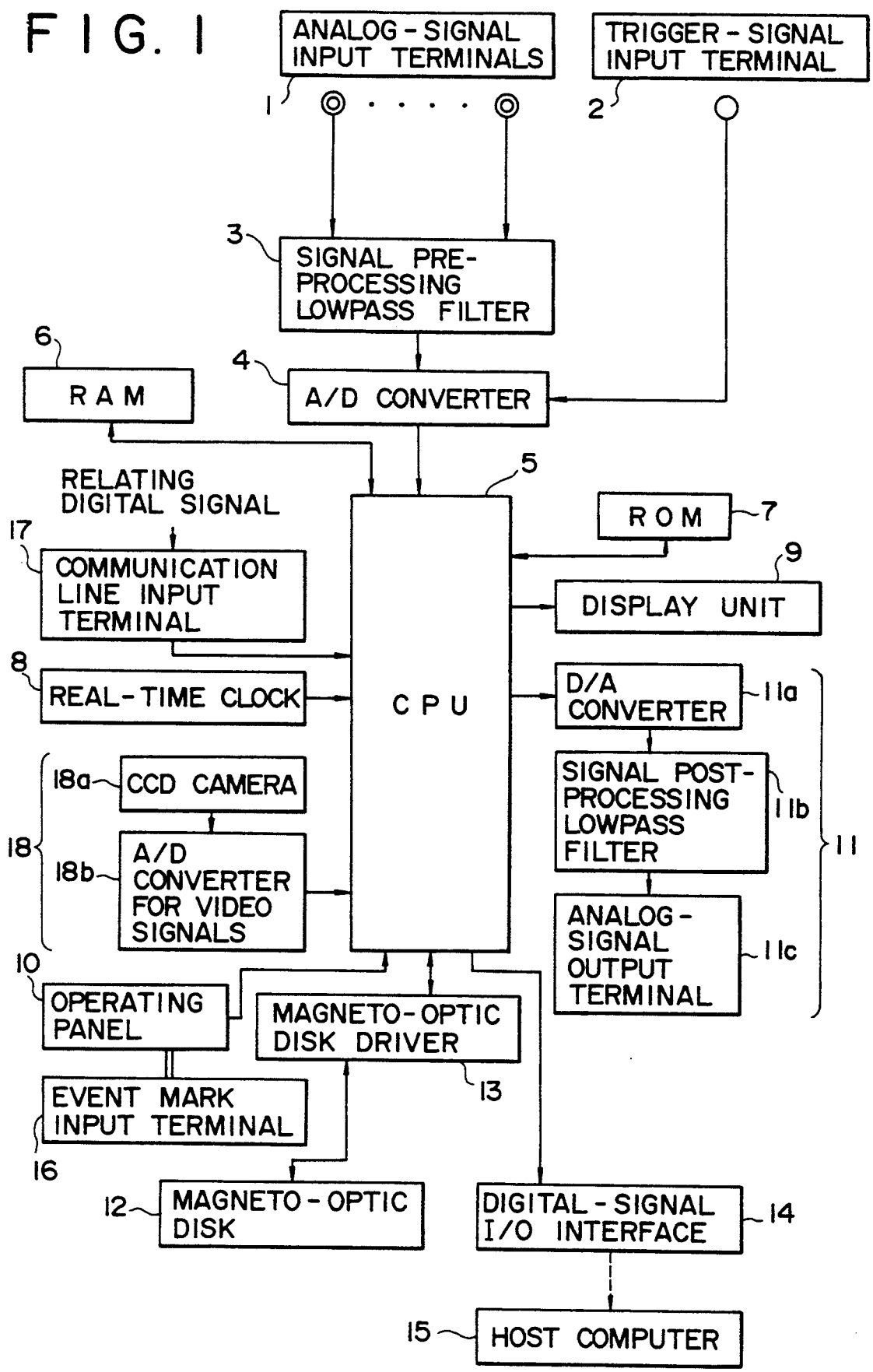

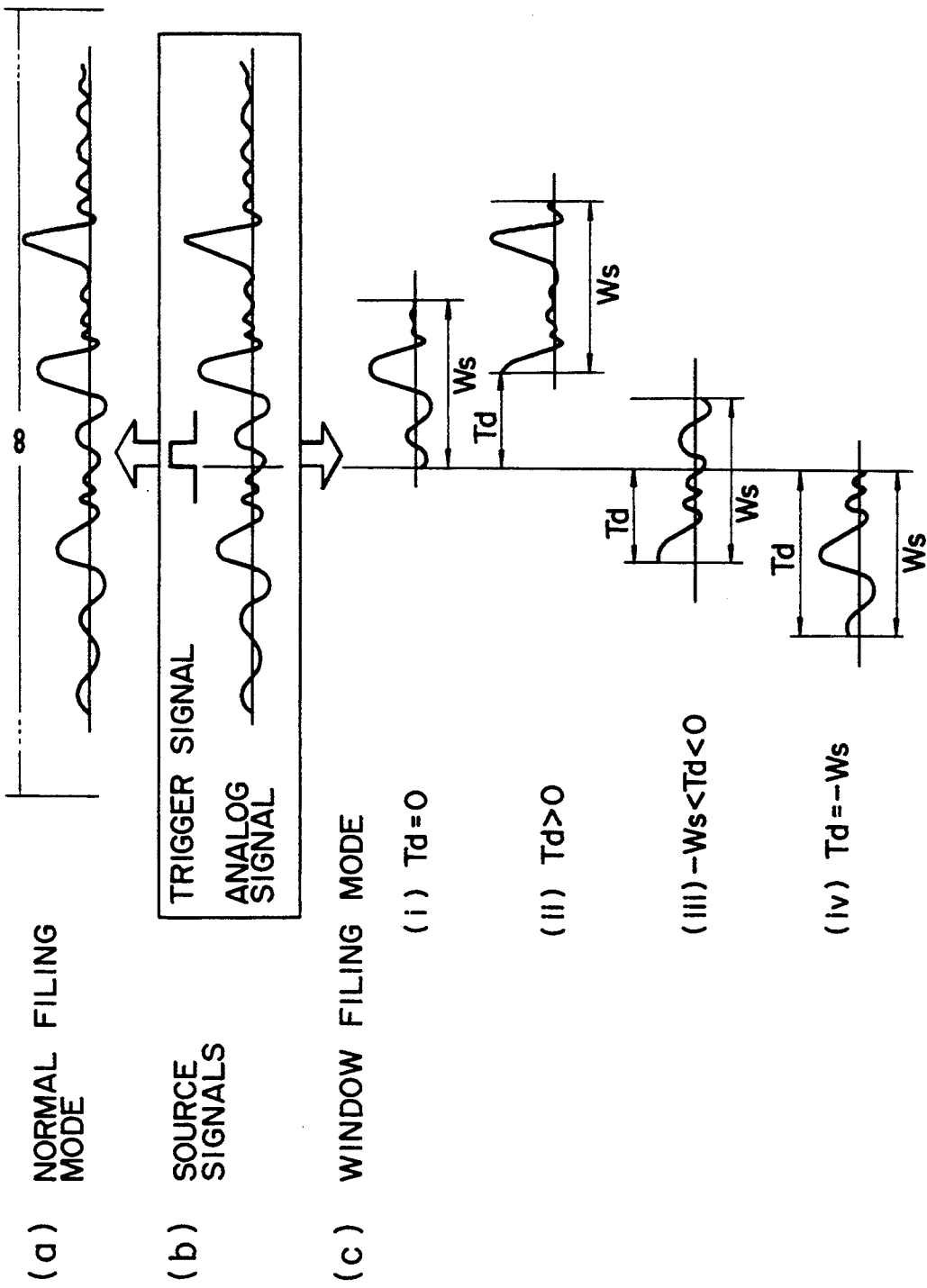

FIG. 3B
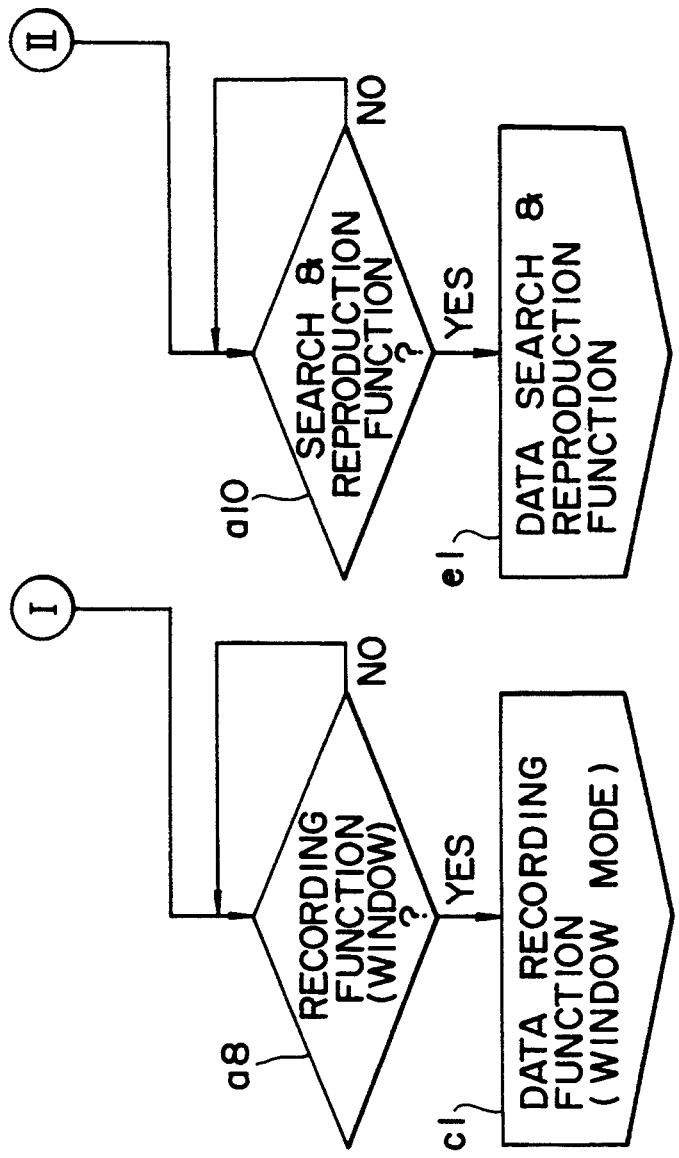
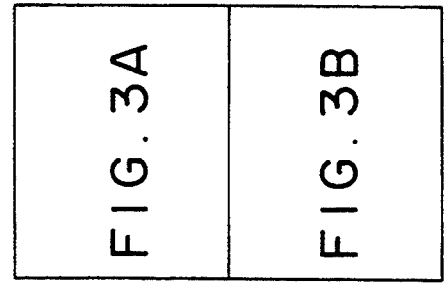

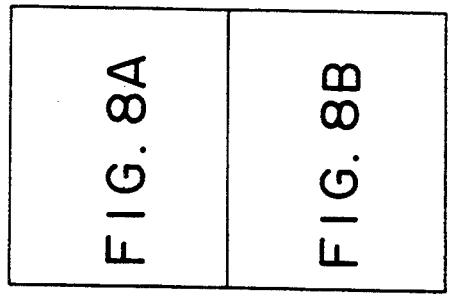
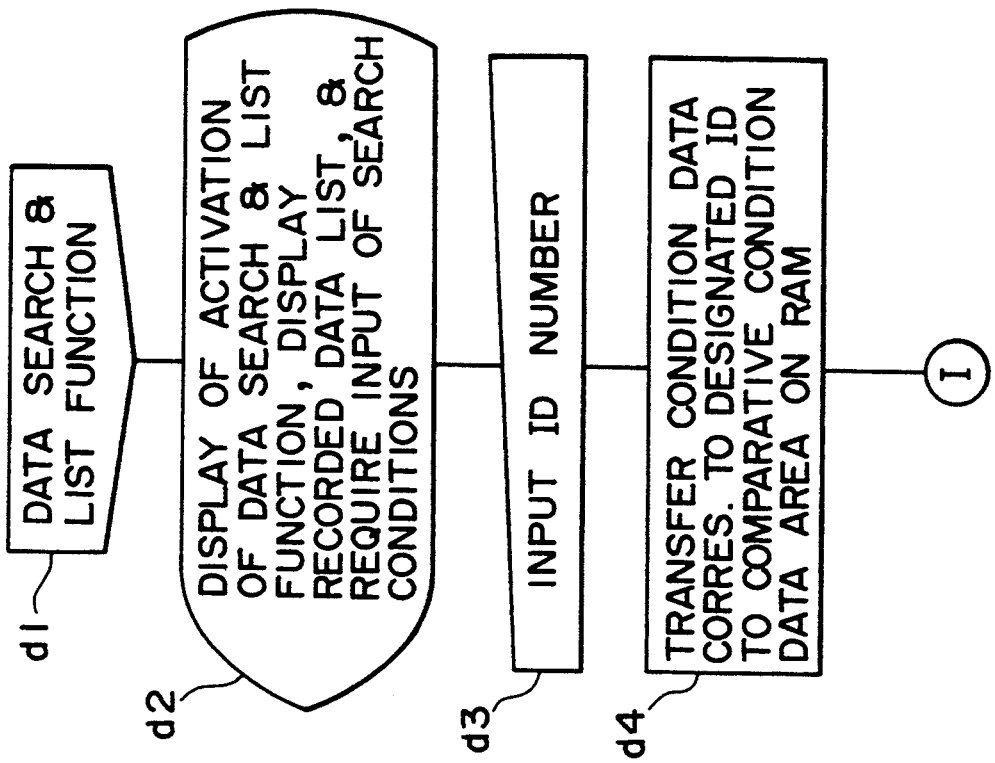

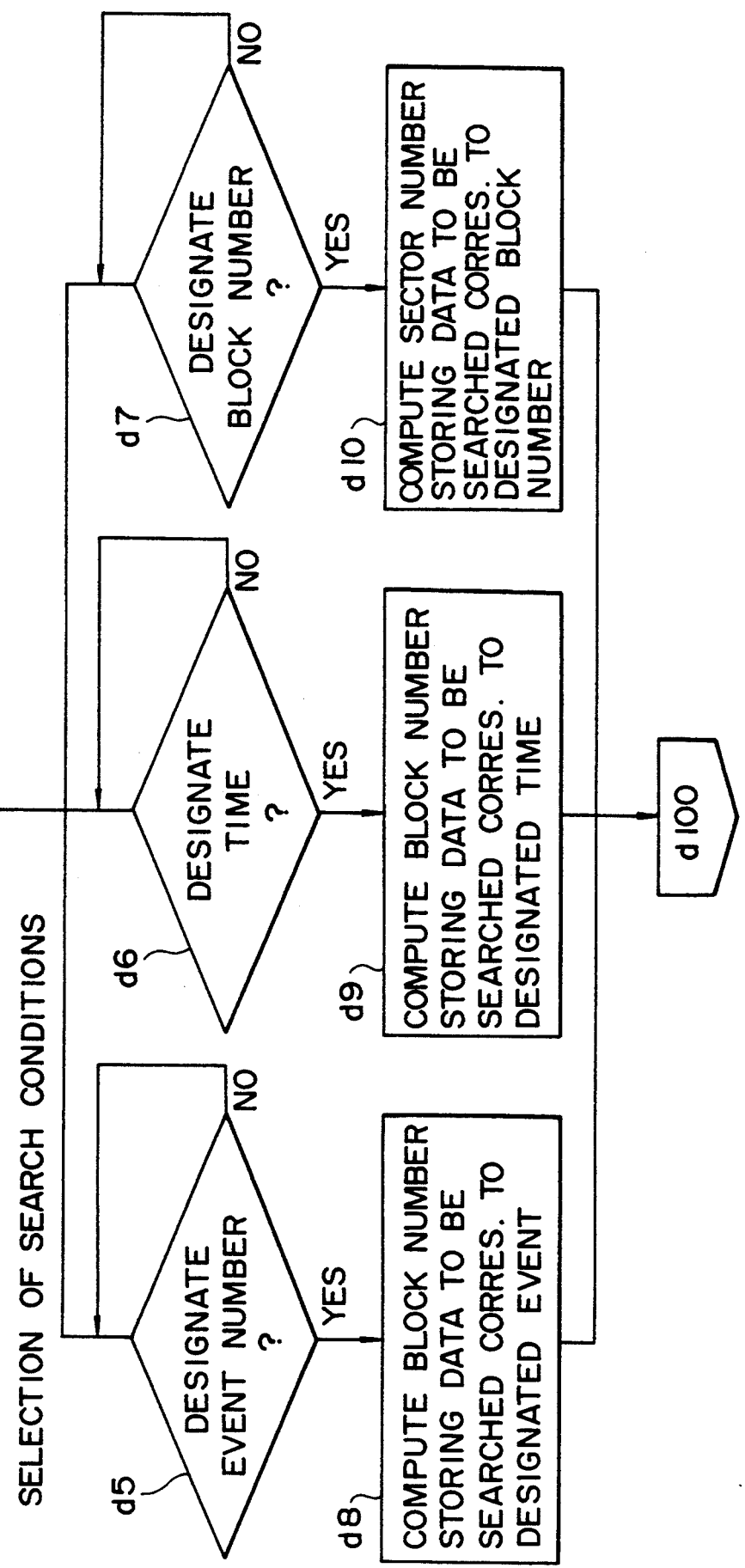

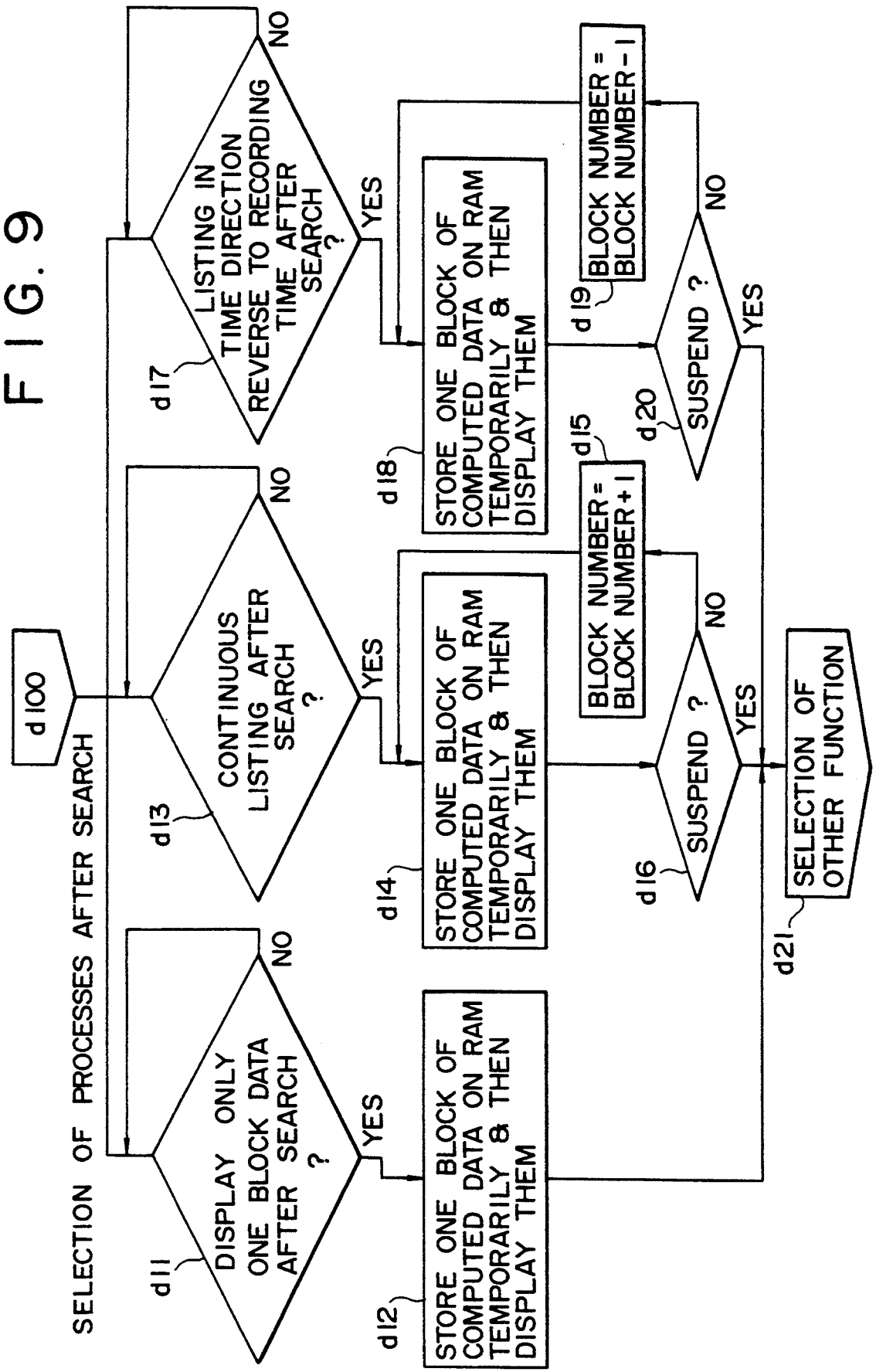

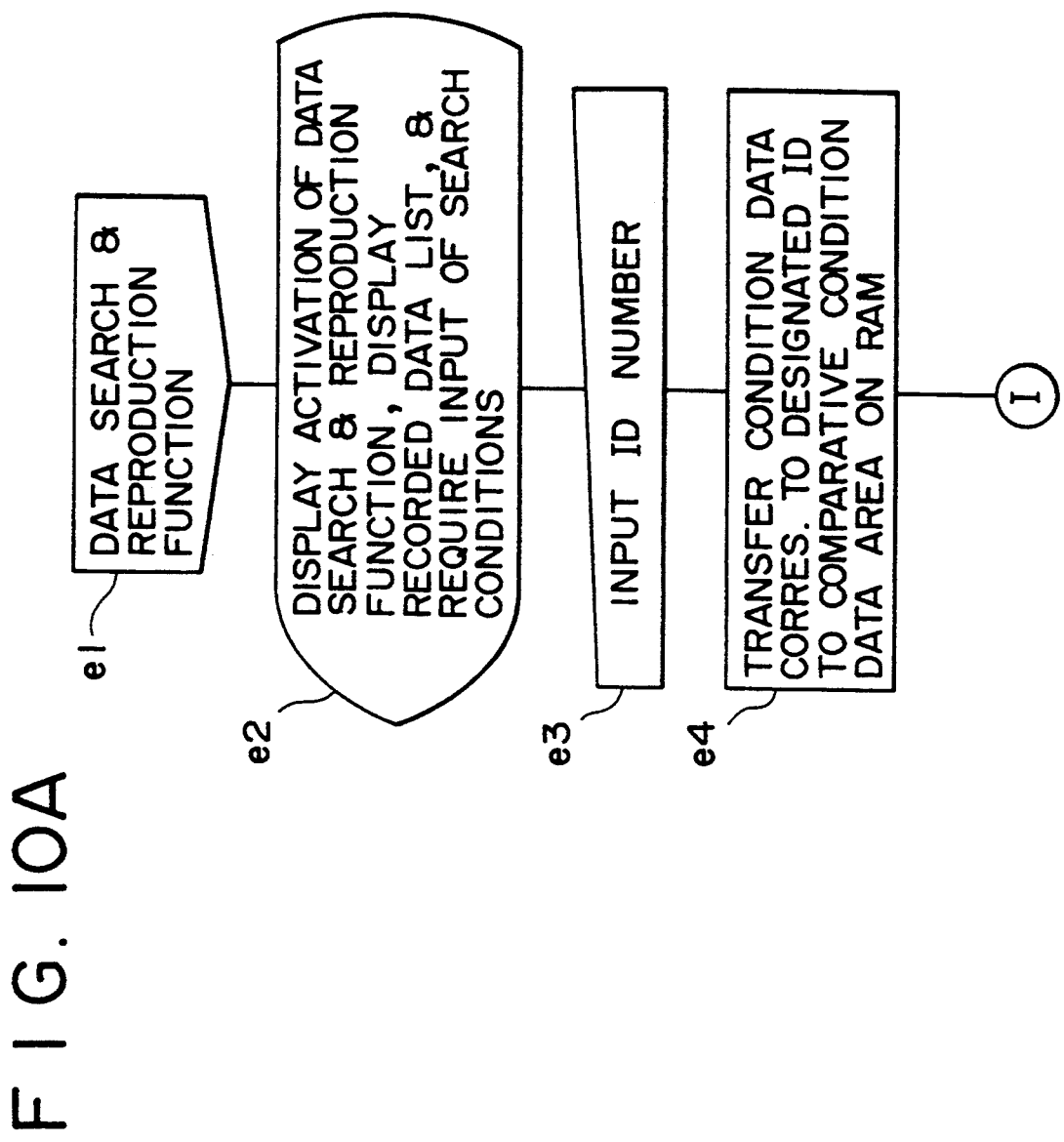

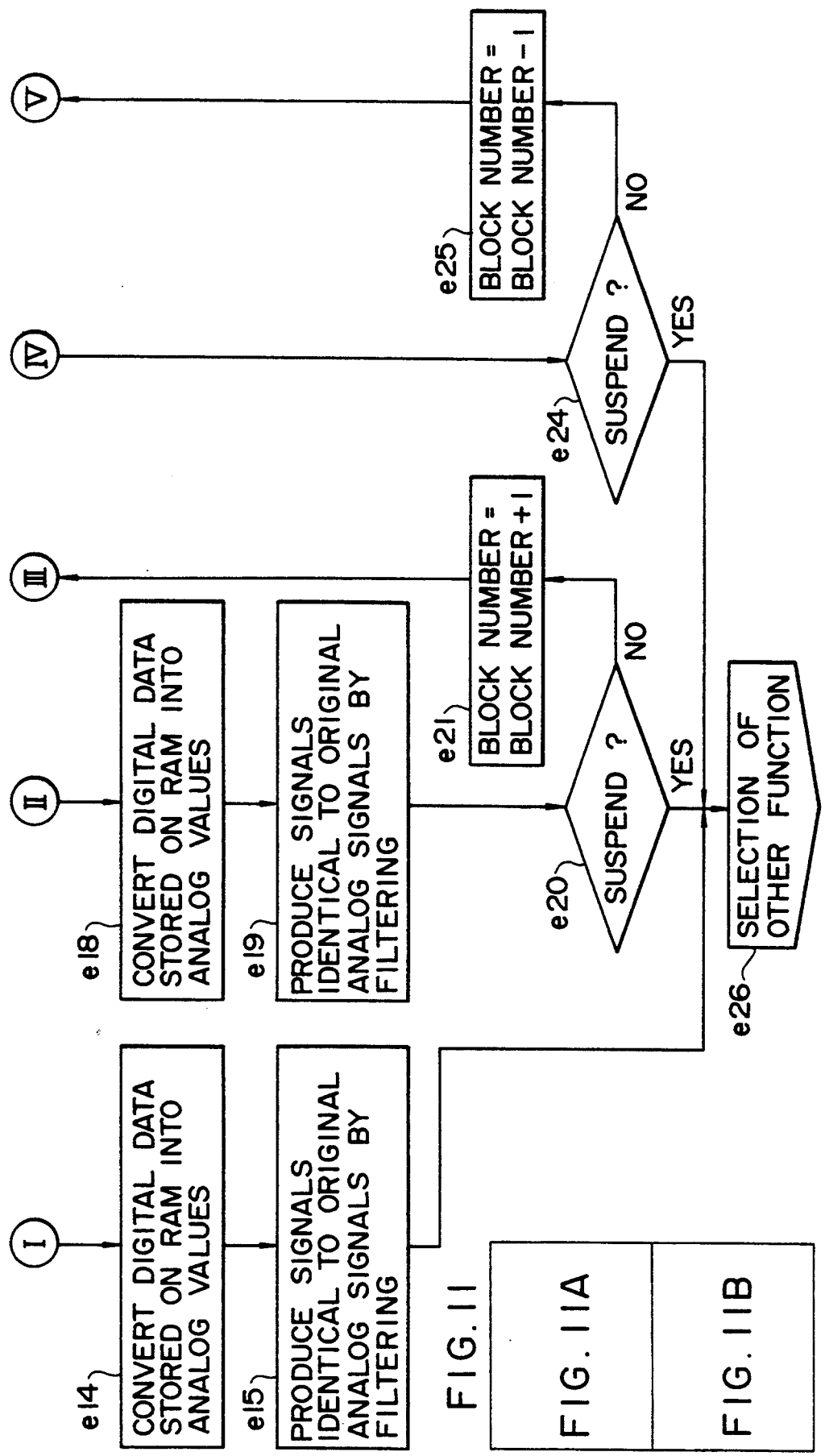

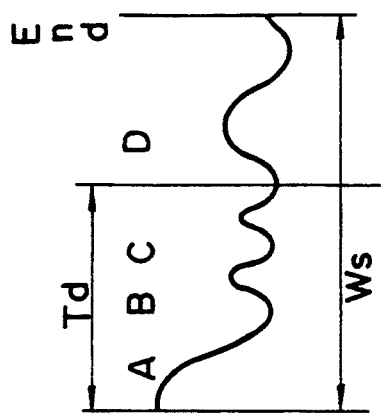
FIG. 13(a)
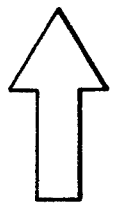
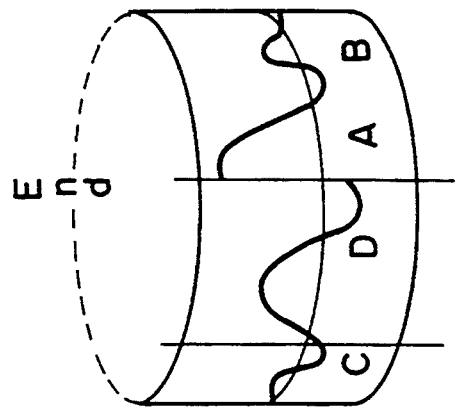
FIG. 13(b)

DATA RECORDING SYSTEM OF MAGNETO-OPTIC TYPE

BACKGROUND OF THE INVENTION

1. Field of the Invention

The present invention relates to a data recording system of a magneto-optic type using a magneto-optic disk and, more particularly, to a magneto-optically data recording system that enables to record and reproduce analog signals of multiple channels as well as to search at a high speed.

2. Description of Related Art

Heretofore, there have been employed apparatuses and systems of magnetically recording tape type, e.g. of open reel type, video cassette type, compact cassette type, DAT tape type, and so on as apparatuses and systems for continuously recording analog signals, such as biological signals, e.g. electroencephalogram, pulses etc., signals indicative of mechanical vibration etc., signals indicative of a variation in temperatures during a chemical reaction etc., and so on, in multiple channels for a long period of time.

However, it should be noted that such apparatuses and system of recording tape type are arranged so as to write or read data while one band of the tape is brought into direct contact with their magnetic head one after another, so that they can produce only sequential files from the principle point of view. Hence, when several kinds of analog data are recorded on one tape, e.g. when data of a first analog phenomenon A are recorded for 50 minutes, data of a second analog phenomenon B are recorded, and data of a third analog phenomenon C are recorded for 50 minutes, an index for the searching contents of the phenomena recorded cannot be recorded at one location, e.g. at a top of the tape. Therefore, in order to allow a certain phenomenon at a particular location to be searched for after recording, there is no way but to read a sequence of the phenomena one after another from the top of the tape and no random search for such a certain phenomenon can be implemented.

Further, it is to be noted that it may take 40 seconds or longer to find data located at the last location of a tape having a recording capacity of 120 minutes when the reading magnetic head is located at the top of the tape even if a search is performed by using an apparatus of a latest DAT type at a speed as fast as a limit speed of 200 times. Further, the apparatuses and systems should be operated by frequently repeating running, suspending and reversing of the tape, so that the tape is expanded or retracted whenever it is caused to run, suspended and reversed, thereby causing a variation in expansion or in winding of the tape and as a consequence incurring mechanical damages upon the tape. As a result, reliability of the data recorded may be lost, whereby incurable defects may arise for the data recording apparatuses and systems that should read and write the data recorded at many repetitive occasions.

SUMMARY OF THE INVENTION

The present invention has been accomplished in order to solve the problems prevailing in the conventional data recording apparatuses and systems and its object is to provide a data recorder of magneto-optic type to implement a search for desired data at an extremely high speed without causing any damage upon the files even if data would have been read and written in many repetitive ways for recording, reproduction and search.

In order to achieve the object as described hereinabove, the magneto-optically data recording system and apparatus according to the present invention is characterized by comprising control means for performing control of operation of each section for recording, reproducing and searching for data; a program memory for storing a program for operating the control means; an operating panel connected to the control means and provided with keys and buttons for entering data, designation, instructions, and so on necessary for operation of the apparatus; a display unit connected to the control means and arranged to display an operation instruction, an operation status of the apparatus, an input monitor, a reproduction monitor, a search information monitor, and so on; input terminals for entering analog signals of multiple channels; A/D conversion means for converting the analog signals of multiple channels entered from the input terminals into digital signals in time series; storage means playing a role as a first temporary storage buffer of analog-to-digital converted data during recording, as a second temporary storage buffer of digital-to-analog converted data during reproduction, and as an operation buffer for search conditions during a search; a magneto-optic disk having a recording data section for storing analog signals digitized by the A/D conversion means and a condition data section as an index for the search on a particular sector; a magneto-optic disk driver for writing and reading signals to and from the magneto-optic disk; and D/A conversion means for converting signals read from the magneto-optic disk into analog signals.

The magneto-optic disk to be employed for the present invention is of such a type that a head is so disposed as to move at a high speed without contact with a disc-type recording medium rotating at a high speed, thereby writing and reading data in and from the magneto-optic disk, so that it can produce random access files from the principle point of view. In order to allow this magneto-optic disk to apply to a search at a high speed, the disk is provided with the recording data section for storing digitized analog informations and the condition data section as an index for the search on a particular sector of the disk. The condition data section is a section for recording an ID number, time for the start of recording, time for the end of recording, an event mark, a sector number of corresponding recording data, and so on. When data of a certain phenomenon at a particular site are to be searched for after recording, only the condition data section corresponding to the index of the data is first to be searched for, so that a search can be finished for a very short period of time. Hence, even if data would have an extremely large capacity, a site designated can be searched for at a high speed as fast as several seconds, e.g. four seconds, including the time when the data is displayed. Further, as the data is read without contact with the head, no damage is caused to occur upon reading the recorded data even if the data is searched and reproduced many times.

Further, when there is provided input means for entering a trigger signal from outside, the system and apparatus according to the present invention can record signals only which occur for a predetermined period of time before and/or after the time when the trigger signal has been entered, whenever the trigger signals have been entered. On the other hand, the conventional apparatuses of recording tape type cannot intermittently record analog signals occurring for a predetermined period of time before and/or after the input of the trigger signal because of mechanical inertia or for other reasons.

It is to be noted herein that the continuous recording is referred to as normal mode filing while the intermittent recording is referred to as window mode filing in the text of this specification which follows.

As the recording system for the system according to the present invention is of a full digital recording type, the digital signals occurring in time series in association with analog signals and transmitted through a communication line are recorded on the recording data section of the magneto-optic disk, together with the analog signals digitized by the A/D conversion means.

Furthermore, a status of recording fields and so on can be digitized as image signals and recorded in an auxiliary recording data section of the magneto-optic disk.

Other objects, features and advantages of the present invention will become apparent during the course of the description of the preferred embodiments, which follows, with reference to the accompanying drawings.

BRIEF DESCRIPTION OF THE DRAWINGS

FIG. 1 is a block diagram showing the configuration of a data recording system and apparatus of magneto-optic type according to an embodiment of the present invention.

FIGS. 2(a-c) are a schematic representation showing a normal filing mode and a window filing mode.

FIGS. 3, 3A and 3B are a flow chart showing the processing of the activation of a power plant for the system and apparatus according to the present invention.

FIGS. 8, 8A and 8B are a flow chart showing a search for data and a list thereof.

FIG. 9 is a flow chart showing a search for data and a list thereof.

FIGS. 10, 10A and 10B are a flow chart showing a search for data and a reproduction thereof.

FIGS. 11, 11A and 11B are a flow chart showing a search for data and a reproduction thereof.

FIGS. 13(a) and 13(b) are a schematic representation showing rearrangement of data on a RAM.

DETAILED DESCRIPTION OF THE PREFERRED EMBODIMENT

Figure 3A:
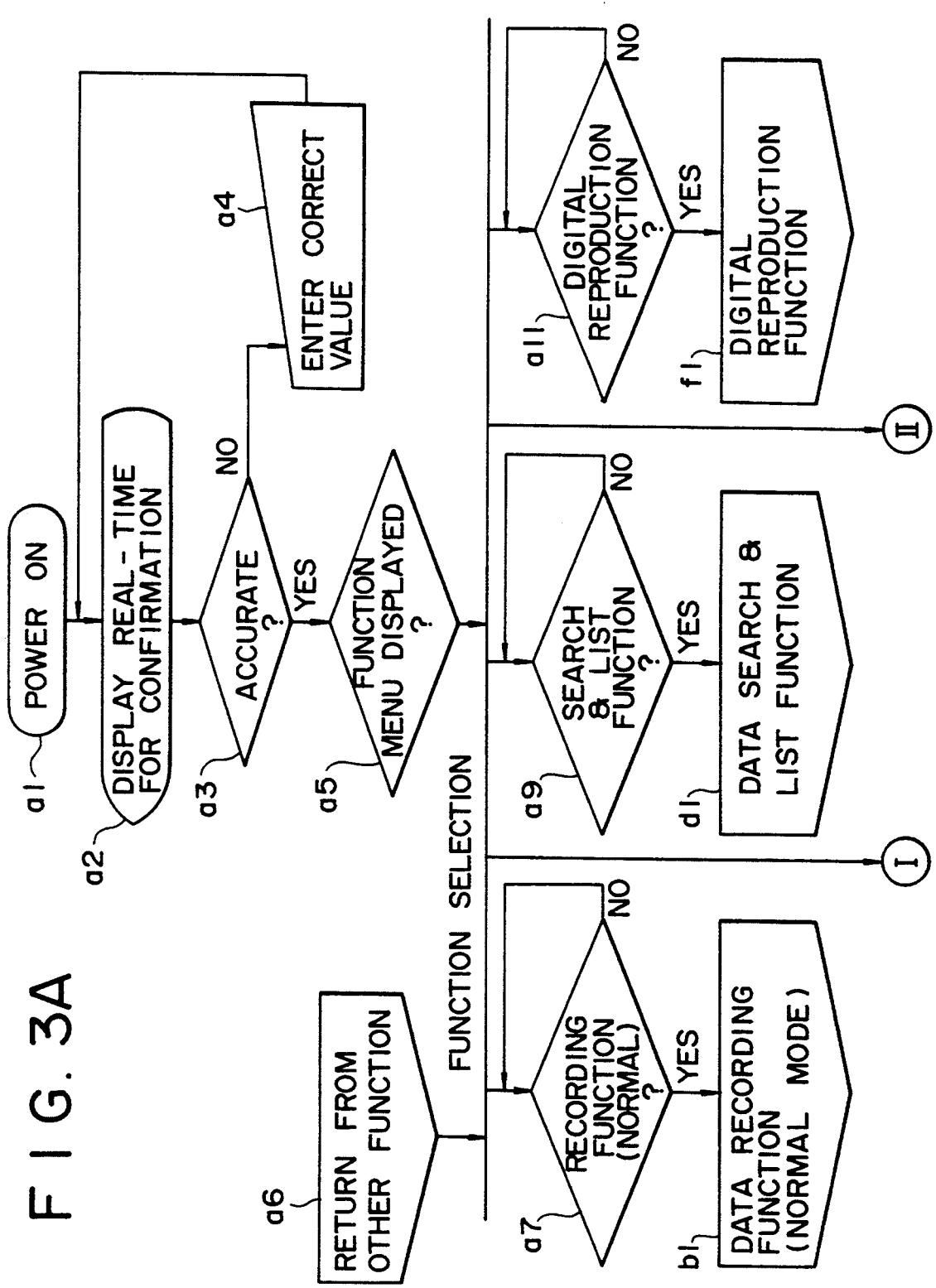

FIG. 1 is a block diagram showing the configuration of a data recording system of Magneto-optic type according to an embodiment of the present invention. Reference numeral 1 stands for input terminals 1 for receiving analog electric signals of multiple channels. In this embodiment, the input terminals are provided for 24 channels, although the number of channels is not restricted to a particular one. Reference numeral 2 stands for an input terminal for entering a trigger signal to provide a standard or reference timing of a window filing mode. Reference numeral 3 stands for a lowpass filter for pre-processing signals to remove unnecessary signals in subjecting the analog signals received by the input terminals 1 to A/D conversion. Reference numeral 4 stands for an A/D converter for converting analog signals output from the lowpass filter 3 into digital signals. Reference numerals 5, 6 and 7 stand for a central processing unit (CPU), a random access memory (RAM) and a read-only memory (ROM), respectively, and these elements constitute the basic configuration of a microcomputer. Stored on the ROM 7 is a program for controlling the CPU 5 which controls operations of peripheral devices and units by a program stored on the ROM 7, as well as transmits and receives data. The RAM 6 is store means for operation processing upon operating the CPU 5 and, in particular, it serves as an important buffer region for writing data on a magneto-optic disk 12 or for reading the data therefrom. More specifically, the RAM 6 plays roles as a temporary store buffer of A/D conversion data during recording data, as a comparison operation processing buffer of search conditions during searching data, as a temporary store buffer of D/A conversion data during reproducing data, and so on. Reference numeral 8 stands for a real-time clock for providing the CPU 5 with real time data such as second, minute, hour, day, month, year, and so on. Reference numeral 9 stands for a display unit for giving an instruction for driving operation as well as monitoring inputs (including monitoring auxiliary video information), monitoring reproduction, and so on. In this embodiment, there is employed an EL display unit, although the display unit is not restricted to a particular one. Reference numeral 10 stands for an operating panel equipped with buttons, keys, and so on, for operating the system according to the present invention. Reference numeral 11 stands for an analog signal reproducing unit for generating recorded digital data as analog signals in the same form as the input signals. The analog signal reproducing unit 11 comprises a D/A converter 11a for converting the digital signals into analog signals, a lowpass filter 11b for post-processing signals to remove an excessive extent of harmonic distortion contained in the analog signals converted from the digital signals, and an output terminal 11c for generating reproduced analog signals of multiple channels. Reference numeral 12 stands for a magneto-optic disk for recording or storing digitized analog signals. Reference numeral 13 stands for a magneto-optic disk driver for writing signals on the magneto-optic disk 12 or reading the signals for search, reproduction and so on. Reference numeral 14 stands for an I/O interface for delivering data (digitized analog signals, simultaneously stored input signals via a communication line or digitized image signals) recorded or stored by the magneto-optic disk 12 to an outside host computer 15 as digital signals. Reference numeral 16 stands for an input terminal for entering an event mark for recording an event mark which is recorded whenever necessary, during recording digitized analog signals in order to facilitate a search at a high speed for data recorded by the magneto-optic disk 12. The event mark is a mark, for example, like a pulse, to be provided on a site or point for attention or emphasis in input data, and the input terminal 16 is provided for entering an event mark provided in a measurement system or the like. Although not shown in the drawings, the operating panel 10 is provided with a switch for entering an event mark, thereby allowing the event mark to be entered in a desired position, for example, while the operator is looking at input analog signals on a display screen of the display unit 9. Reference numeral 17 stands for an input terminal for fetching digital signals relating to analog signals to be entered after digitization through a communication line. Reference numeral 18 stands for a unit for entering video signals for auxiliary recording the status of data recording fields or the like prior to the start of recording. In this embodiment, the unit constitutes a CCD camera 18a and an A/D converter 18b for video signals.

Description will now be made of major functions of the units and devices for the system and apparatus according to the present invention.

A. Recording function

The recording function is a function for digitizing analog signals of a single channel or multiple channels and recording the digitized analog signals on the magneto-optic disk, and this function comprises a normal filing mode and a window filing mode. This function may record information transmitted via a communication line or video information, when desired.

A-1. Normal filing mode

The normal filing mode is a mode for recording or storing the digitized analog signals of a single channel or multiple channels on the magneto-optic disk 12 continuously for a long period of time.

Description will now be specifically made of the way of implementing this mode. First, the operator enters an ID number for specifying data to be entered, a way of recording (filing mode), and an instruction to start recording through the operating panel 10, thereby transmitting the information and the instruction to the CPU 5. As the CPU 5 recognizes them, it sets sampling conditions etc., on the A/D converter 4 and the lowpass filter 3 for pre-processing signals and gives an instruction to the magneto-optic disk driver 13 to write these conditions on a condition data section of the magneto-optic disk 12, together with information from the real-time clock 8. At this time, when an instruction is given by the operating panel 10 to record or store the status of a data recording (measuring) field and so on as still or moving picture information, digitized video signals to be transmitted from the input device 18 are written on an auxiliary data section that is part of the recording data section of the magneto-optic disk 12.

The analog signals of a single channel or multiple channels, which has been introduced into the input terminals 1, are converted into their digital values by the A/D converter 4 after unnecessary high-frequency noises have been removed by the lowpass filter 3 for pre-processing signals, and thereafter they are stored temporarily on the RAM 6. If there are digital signals relating to the analog signals, they are entered from the input terminal 17 for a communication line and stored temporarily on the RAM 6, too. The digital values stored temporarily on the RAM 6 are written continuously one after another on the recording data section of the magneto-optic disk 12 unless an instruction to stop writing is given from the operating panel 10. When an event mark is entered from the input terminal 16 during the period of time when the digital values stored temporarily on the RAM 6 are written continuously on the recording data section of the magneto-optic disk 12, it is written on the condition data section of the magneto-optic disk 12 together with information on the corresponding real time from the real-time clock 8.

As the CPU 5 has recognized the instruction to stop writing from the operating panel 10, this information is written on the condition data section of the magneto-optic disk 12 together with the information on the corresponding real time from the real-time clock 8.

A-2. Window filing mode

The window filing mode is a mode for recording or storing in the magneto-optic disk 12 the analog signals of a single channel or multiple channels in a predetermined area before and/or after the input of a trigger signal, not in the entire area. In this mode, the recording is performed in substantially the same manner as the normal filing mode, except for automatically stopping fetching data at once or after a predetermined period of time when the CPU 5 has recognized the input of the trigger signal into the input terminal 2.

B. Searching function

The system according to the present invention can effectively perform a search at a high speed by taking advantage of the information and data written on the condition data section of the magneto-optic disk 12. During recording, there have been written on the condition data section of the magneto-optic disk 12 the ID number, recording mode, sampling speed, time to start and stop recording, time to enter the event mark, sector number of the recording data section, and so on, simultaneously with recording of data (digitized analog signal data) in the recording data section of the magneto-optic disk 12.

The specific ways of realizing the searching function will now be described hereinafter. First, as the CPU 5 fetches the searching function by an instruction from the operating panel 10, the contents of the condition data section of the magneto-optic disk 12 are displayed on a display screen of the display unit 9 to inform the operator of the recorded data. At this time, video information stored in the auxiliary data section thereof may be displayed, when requested. Then, the operator enter the ID number, time, event number, and so on, for data to be searched for from the operating panel 10 by referencing the contents displayed on the screen. As the CPU 5 has recognized these information and data, the particular sector number to be searched for in the condition data section of the magneto-optic disk 12 is computed and processed on the basis of the contents of the condition data section thereof. Then, data corresponding to the sector number computed is read from the magneto-optic disk 12 and stored temporarily on the RAM 6. The data is then displayed on the display screen of the display unit 9.

C. Reproducing function

In the same manner as the searching function, the CPU 5 can generate the analog signals by delivering the data on the RAM 6 to the analog signal reproducing device 11, at the same time when the display unit 9 displays the data at the particular location specified by the operator, which has been searched for and stored temporarily on the RAM 6. In addition, the data searched for and stored temporarily on the RAM 6 can be delivered as digital signals on the basis of an instruction from the CPU 5.

The operation of the system according to the embodiment of the present invention will be described in detail with reference to the flow charts as shown in the accompanying drawings.

First, description will be made of the operation for recording in the normal filing mode. As shown in FIG. 2(a), the normal filing mode is a mode for fetching entire analog signals continuously without restriction and storing them in the magneto-optic disk 12 from the time when an instruction to start recording has been given to the time when an instruction to stop recording is given. In order to fetch the analog signals continuously without restriction, two blocks of store regions of a particular size should be given on the RAM 6. In this description, a store region of a particular size is referred to as a block. As the instruction to start recording has been given, the analog signals are converted into digital signals and then written one after another in the first block and stored. As the first block becomes full with the digitized analog signals, the contents are transferred to the magneto-optic disk 12, while the digitized analog signals are continuously written one after another in the another block. The continuous filing without restriction can be performed by repeating the operations as described hereinabove while changing the blocks to be written in an alternate fashion.

Figure 4:
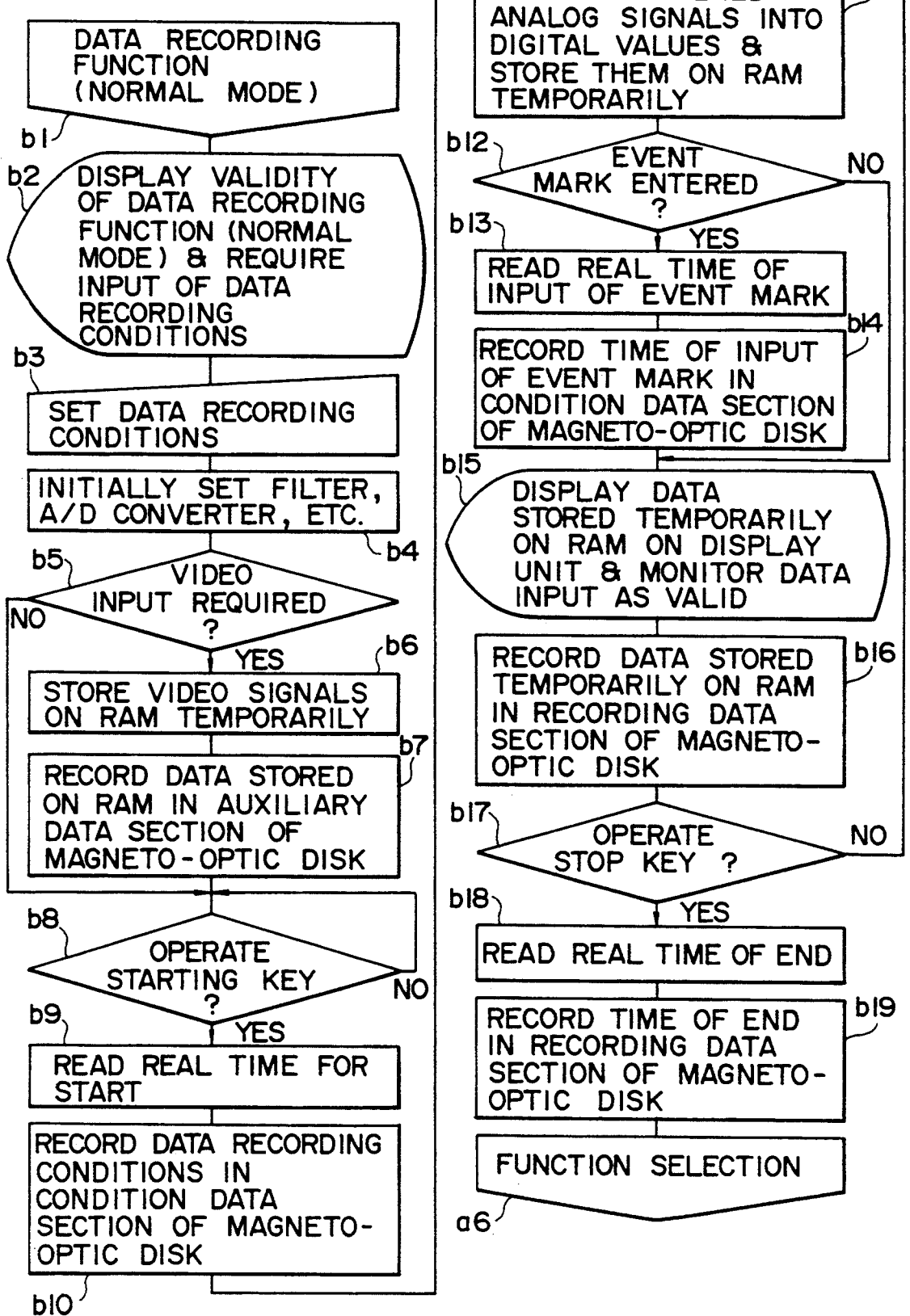
FIGS. 4 is a flow chart showing the data recording in the normal filing mode.

This operation will be described more in detail with reference to the flow charts as shown in FIGS. 3 and 4. First, at step a1 of FIG. 3, power is applied to start operating the program stored in the ROM 7 to start controlling the CPU 5. Then, at step a2, the time of the real-time clock 8 is displayed for confirmation of accuracy and a decision is made at step a3 to determine if the real time displayed is accurate. If the result of decision at step a3 indicates that the real time displayed is not accurate, then the program flow goes to step a4 at which the correct real time is entered from the operating panel 10, followed by the return to step a2. When it is decided at step a3 that the real time displayed is correct, then, a list of the functions is displayed at step a5 and selected by operating the corresponding key on the operating panel 10. The functions include the recording function in normal filing mode at step a7, recording function in window filing mode at step a8, searching and listing function at step a9, searching and reproducing function at step a10, and digital reproducing function at step a11.

Then, at step a7, a decision is made to determine if the recording function in normal filing mode is selected. When the recording function in normal filing mode is selected at step a7, then the program flow goes to step b1 from which the recording function in normal filing mode is operated in the manner as will be shown in FIG. 4.

In implementing the data recording function in normal filing mode at steps b1 et seq, the program flow goes to step b2 at which it is confirmed on the screen of the display unit 9 that the valid data recording in normal filing mode is performed, and simultaneously at which a request for the input of recording conditions such as ID number, channel number, sampling speed, necessity or unnecessity for video input etc., is made. Then, at step b3, the operator enters and sets the desired conditions for recording data through the operating panel 10, followed by proceeding to step b4 at which the initial setting is made for the lowpass filter 3 and the A/D converter 4 in accordance with the sampling speed and the channel number. Then, the program flow goes to step b5 at which a decision is made to determine if the video input is required in setting the recording conditions. When the result of decision at step b5 indicates that the video input is required, then the program flow goes to step b6 at which the video input signals are fetched from the CCD camera 18a through the A/D converter 18b and stored temporarily on the RAM 6. Then, at step b7, the data stored temporarily by the RAM 6 are then recorded on the auxiliary data section of the magneto-optic disk 12 by the magneto-optic disk driver 13, followed by proceeding to step b8. On the other hand, when it is decided at step b5 that no video input is required, then the program flow goes to step b8.

Then, at step b8, a decision is made to press a key to start recording on the operating panel 10. When it is decided at step b8 that the key to start recording is pressed, then the program flow goes to step b9 at which there is read the real time when the recording starts, followed by proceeding to step b10 at which the conditions for recording data, such as data fetching mode, ID number, sampling speed, channel number, real time to start recording etc., are recorded on the condition data section of the magneto-optic disk 12. Then, at step b11, the analog signals of a single channel or multiple channels fetched from the input terminals 1 are processed with the lowpass filter 3 and then converted into digital values by the A/D converter 4, and the digitized signals are temporarily stored on the RAM 6. Thereafter, at step b12, an event mark is entered, as required, from the event mark input terminal 16 or an event mark input switch (not shown) of the operating panel 10 in order to show a list of events in searching for data in a manner as will be described hereinafter. When the event mark is entered at step b12, then the program flow goes to step b13 at which there is read the real time when the event mark has been entered, followed by proceeding to step b14 at which the time of entering the event mark is recorded on the condition data section of the magneto-optic disk 12 and then to step b15. On the other hand, when no event mark is entered at step b12, then the program flow goes directly to step b15.

Then, at step b15, the data stored temporarily on the RAM 6 are displayed on the display unit 9 to thereby enable input monitor, followed by proceeding to step b16 at which the data are transferred to the magneto-optic disk 12 to record them on their recording data section. After step b16, the program flow goes to step b17 at which a decision is made to press a key on the operating panel 10 to stop recording. When the result of decision at step b17 indicates that the key to stop recording is pressed, then the program flow goes to step b18 at which the real time to stop recording is read by the real-time clock 8. Then, at step b19, the time of stop is recorded on the recording data section of the magneto-optic disk 12.

On the other hand, when it is decided at step b17 that no key to stop recording is pressed, then the program flow goes back to step b11 from which the processes are repeated in the same manner as described hereinabove until the key to stop recording is pressed.

After step 19, the program flow returns to step a6 to allow the operator to select the desired function.

Figure 5:
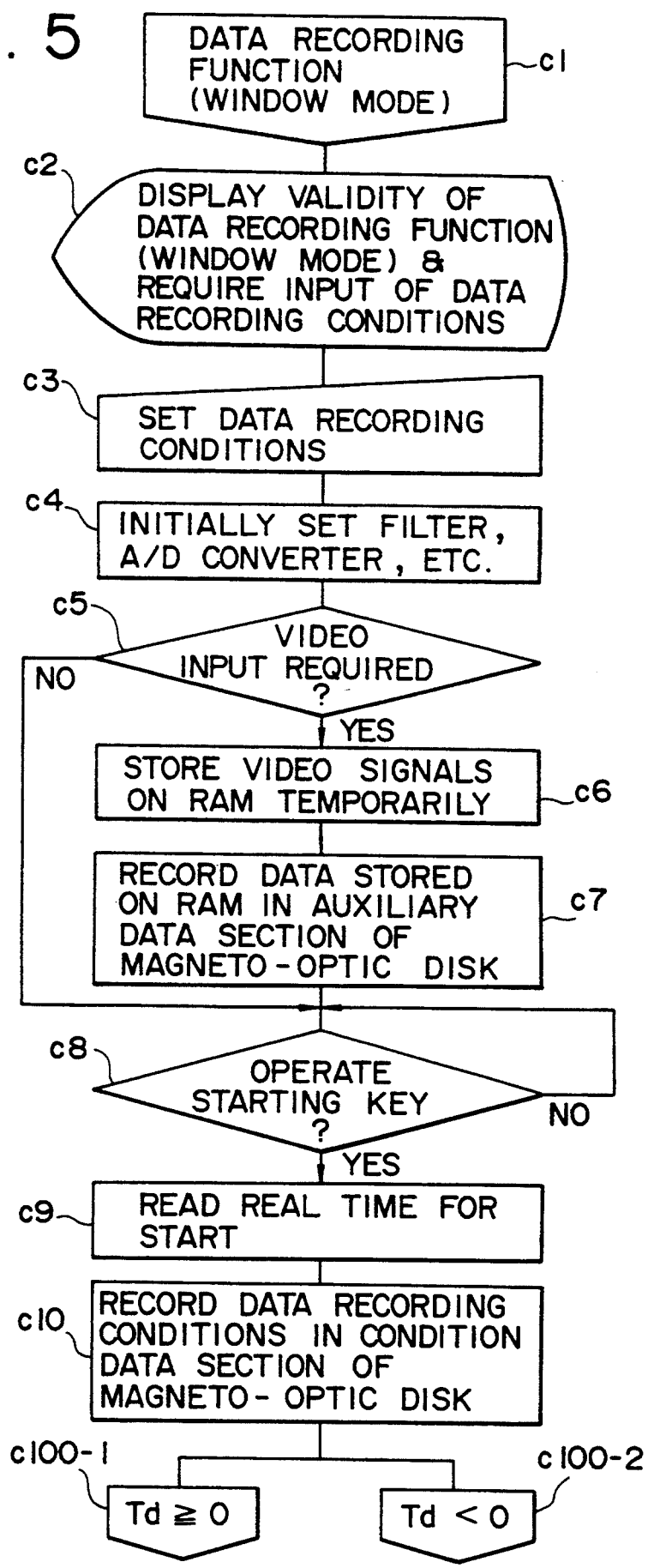
FIG. 5 is a flow chart showing the data recording in the window filing mode.
Figure 6:
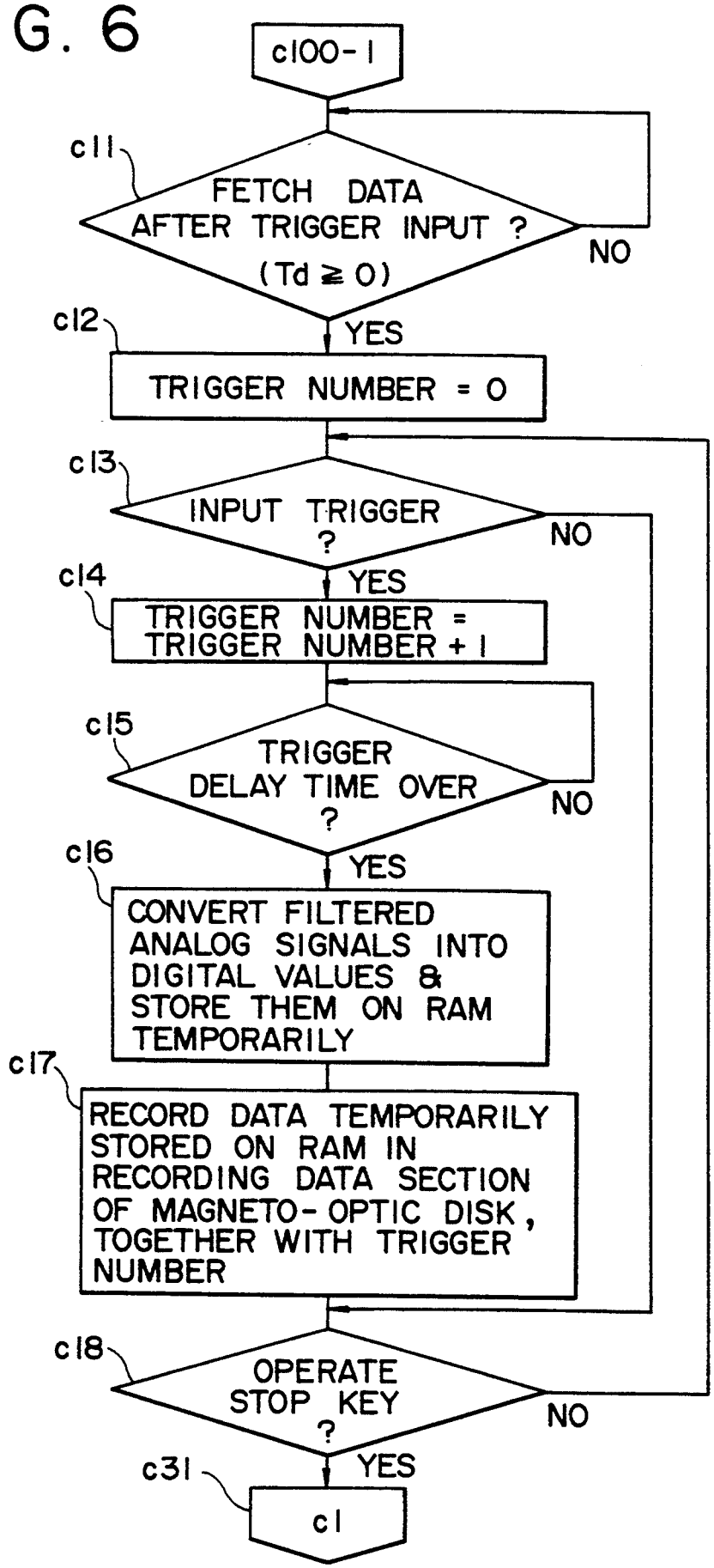
FIG. 6 is a flow chart showing the data recording in the window filing mode.
Figure 7:
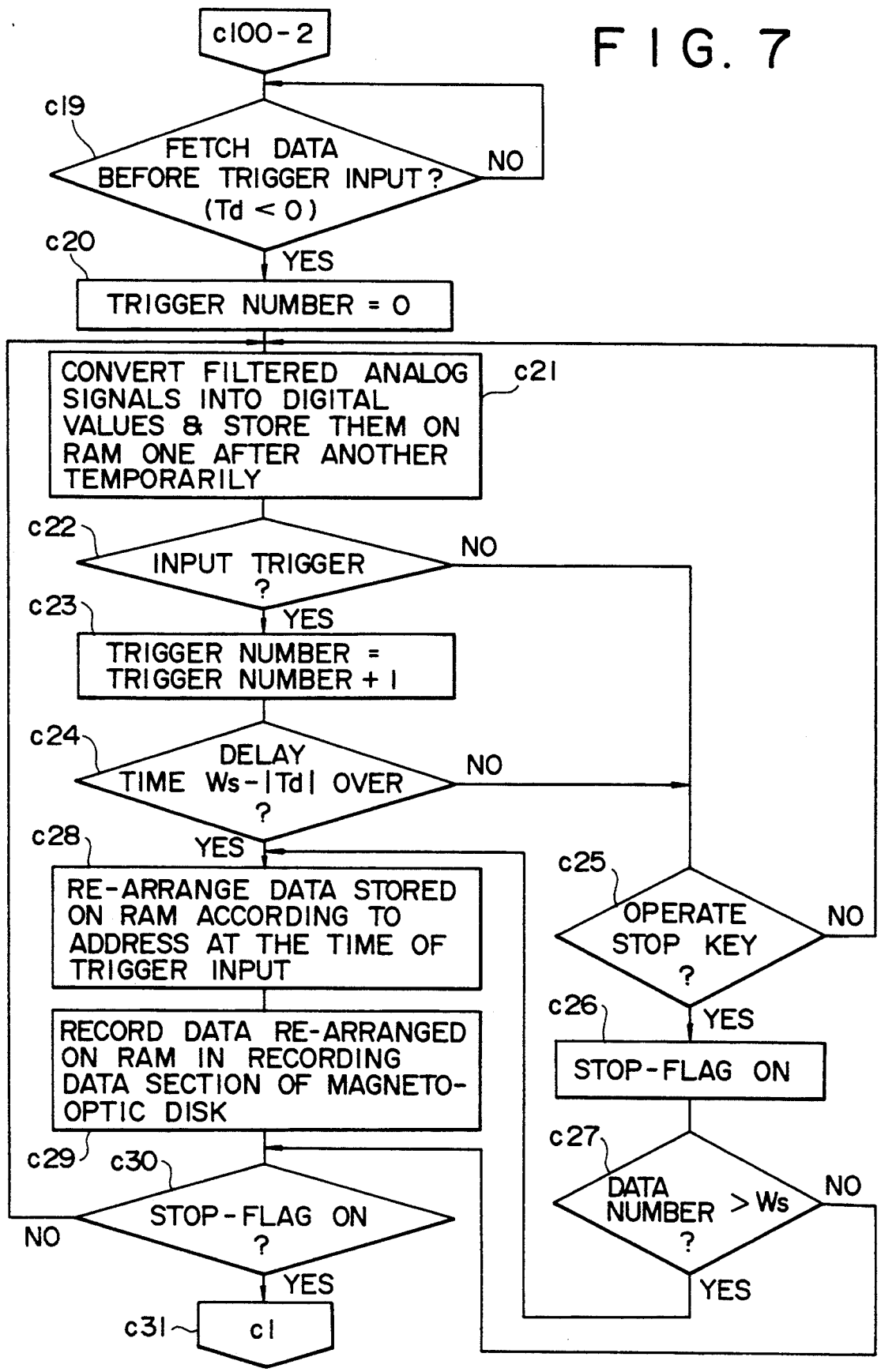
FIG. 7 is a flow chart showing the data recording in the window filing mode.

Next, description will be made of the data recording function in window filing mode with reference to FIGS. 5 to 7. The system according to the present invention enables to record/store multi-channel data (digitized analog signals) in a predetermined area before and/or after the input of a trigger signal, although the conventional system cannot. In this window filing mode, a trigger signal is fetched by the input terminal 2, the analog signals are digitized only in the predetermined region (this region being herein referred to as "Ws") from the time, as a reference point, whenever the trigger signal is entered, and the digitized analog signals are recorded on the magneto-optic disk, until the an instruction to stop recording is given after an instruction to start recording has been given.

To determine the region where the data should be fetched on the basis of the reference point, four kinds of a trigger delay time (hereinafter sometimes referred to as "Td") are set as shown in FIG. 2.

(i) $Td = 0$: Signals in the region Ws are fetched immediately after the input of the trigger signal.
(ii) $Td > 0$: Signals in the region Ws are fetched when the time Td has elapsed after the input of the trigger signal.
(iii) $-Ws < Td < 0$: Signals in the entire region Ws before and after the input of the trigger signal are fetched.
(iv) $Td = -Ws$: Signal in the region Ws immediately before the input of the trigger signal are fetched.

Referring now to FIG. 3, the recording function in window filing mode is selected at step a8, followed by proceeding to step c1 at which the data recording function is performed in the window filing mode.

The data recording function in window filing mode is implemented at steps c1 to c10 in substantially the same manner as at steps b1 to b10 for implementing the data recording function in normal filing mode, respectively. Then, when the trigger delay time Td is set 0 or larger than zero, i.e. a positive number, the program flow goes to step c100-1. On the other hand, when the trigger delay time Td is set smaller than zero, i.e. a negative number, then the program flow goes to step c100-2.

When the step c100-1 is selected, then the program flow goes to step c11 (FIG. 6) at which the key to start recording on the operating panel 12 is pressed to give an instruction to start recording. In this case, no processing is implemented until the trigger signal is entered. In other words, the data present in the area Ws are fetched immediately after the trigger signal has been entered ($Td=0$; case (i) in FIG. 2) or after the trigger delay time Td has been elapsed from the input of the trigger signal ($Td>0$; case (ii) in FIG. 2). Then, the program flow goes to step c12 at which the trigger number is set to zero, followed by proceeding to step c13 at which it is decided to determine if the trigger signal has been entered. When the result of decision at step c13 indicates that the trigger signal is entered, on the one hand, the program flow goes to step c14 at which the trigger number is renewed by adding one (1) to the previous trigger number. Then, at step c15, a decision is made to determine if the trigger delay time Td is over. When it is decided at step c15 that the trigger delay time Td is over, then the program flow goes to step c16 at which the analog signals are fetched and processed by the lowpass filter 3 and the resulting analog signals are digitized with the A/D converter 4 to temporarily store the data in the region Ws on the RAM 6. This writing is continued until the store region ensured on the RAM 6 becomes full with the data. Then, at step c17, the data stored temporarily on the RAM 6 are transferred and recorded in the recording data section of the magneto-optic disk 12 with the data provided with the trigger number. The trigger number referred to herein is a number of the trigger signal valid after the instruction to start recording has been given, and the trigger number is utilized upon search by writing in the magneto-optic disk 12. When the data recording is to be ceased, the key to stop recording is pressed at step c18 in the same manner as in performing the data recording in normal filing mode, thereby returning the program flow to step c1.

When no key to stop recording is pressed at step c18, then the program flow goes back to step c13 at which a decision is made to determine if the trigger signal is entered. On the other hand, when it is decided at step c13 that no trigger signal is entered, then the program flow goes to step c18 at which a decision is made to determine if the key to stop recording is to be operated.

On the other hand, when step c100-2 is selected, the program flow goes to step c19 (FIG. 7) at which the key to start recording on the operating panel 10 is pressed to give an instruction to start recording. In this case, the data fetching starts at the same time as the press of the key. In other word, the fetching of analog signals via input terminals 1 starts prior to the input of the trigger signal. Then the program flow goes to step c20 at which the trigger number is set to zero, followed by proceeding to step c21. At step c21, the analog signals fetched are filtered by the lowpass filter 3, converted into the corresponding digital values by the A/D converter 4, and then stored one after another in the store region of Wind size Ws ensured on the RAM 6. In this case, as the data reaches the last address in the store region of Ws upon writing the data in the store region of the RAM 6, the data which follows is stored from the top address of the store region so as to overlap with the past data. In other words, the data are written as if the addresses were circled within the window size Ws in a ring-shaped fashion, as shown in FIG. 13(a). The writing operation at steps c21 to c23 is continued after the input of the trigger signal at step c22 until a delay time Ta has been elapsed. The delay time Ta here means the time period corresponding to (Ws−Td), where Td represents the absolute value of Td. Then, a decision is made to determine if the delay time Ta is over. If it is decided at step c24 that the delay time Ta is over, then the program flow goes to step c28 at which the data stored temporarily on the RAM 6 are re-arranged according to the addresses at the time of the input of the trigger signal. In other words, as shown schematically in FIG. 13, the addresses in the ring-shaped form are rearranged to the addresses in a band-shaped form so as to allow the End point of the data stored temporarily on the RAM 6, as shown in FIG. 13(a), to become the last address of the store region, as shown in FIG. 13(b). Thus, the data present in the region Ws set to satisfy the condition of $-Ws \leq Td < 0$ are fetched and stored on the RAM 6. Then, at step c29, the data re-arranged in correct order on the RAM 6 are transferred and stored in the recording data section of the magneto-optic disk 12. At this time, there is written on the magneto-optic disk 12 information as to whether the data corresponds to which number of the valid trigger signal after the instruction to start recording has been given. This information is utilized during a search. The termination of the recording is carried out at step c30 in the same manner as described hereinabove.

The following is description of the operation for searching for or listing data with reference to FIGS. 8 and 9.

When the function for searching and listing is selected at step a9 in FIG. 3, the program flow goes to step d1 in FIG. 8, at which this function becomes ready to start. Then, at step d2, the activation of the searching and listing function is displayed on the display unit 9 and a list of the recorded data is displayed thereon from the contents of the condition data section of the magneto-optic disk 12, thereby requesting the operator to enter the searching conditions. Thereafter, at step d3, the ID number is entered from the operating panel 10, followed by proceeding to step d4 at which the searching conditions such as time to start recording, time to end recording, sampling speed, a row of event input times, time to start, sector address (hereinafter referred to as top sector number of) a recording data area, etc. corresponding to the ID number specified are transferred to a comparative conditions data area set on the RAM 6.

Then, the searching conditions are selected. The conditions include the event number to be specified at step d5, the time to be specified at step d6 and the block number to be specified at step d7. To specify the event number is selected at step d5, then the program flow goes to step d8 at which there is computed the block number of the block in which are stored the data to be searched for, which correspond to the event specified, from the relationship among the row of the event times, top sector number and sampling speed in the comparative conditions data area on the RAM 6. To specify the time is selected at step d6, then the program flow goes to step d9 at which there is computed the block number of the block in which are stored the data to be searched for, which correspond to the time specified, from the relationship between the top sector number and sampling speed in the comparative conditions data area on the RAM 6. To specify the block number is selected at step d7, then the program flow goes to step d10 at which there is computed the sector number of the block in which are stored the data to be searched for, which corresponds to the block number specified, from the relationship between the top sector number and sampling speed in the comparative conditions data area on the RAM 6.

From the search results computed on the basis of the searching conditions as described hereinabove, the process to be performed is selected at step d100 at which the process after the search is selected. As shown in FIG. 9, selection is made for the display of one block only (at step d11), the continuous display of a list of data (at step d13) and the display of a list of data in the direction opposite to the recorded time (at step d17).

When the display of one block only is selected at step d11, then the program flow goes to step d12 at which one block of the data corresponding to the block number computed is temporarily stored on the RAM 6 and thereafter displayed on the display unit 9. When the continuous display of the list of data is selected at step d13, then the program flow goes to step d14 at which one block of the data corresponding to the block number computed is temporarily stored on the RAM 6 and thereafter displayed on the display unit 9. In this case, the block number is specified at step d15 by adding one (1) to the previous block number. In other words, after the data is displayed at step d14, a decision is made at step d16 to determine if the display should be stopped. When it is decided at step d16 not to stop the display, on the one hand, then the program flow goes to step d15 at which the block number is renewed by adding one to the previous block number, followed by the return to step d14. When it is decided at step d16 to stop the display, on the other hand, the program flow goes to step d21 at which the other function is to be selected. Further, when the display of the list of data in the opposite direction is selected at step d17, then the program flow goes to step d18 at which one block of the data of the block number computed is temporarily stored on the RAM 6 and thereafter displayed on the display unit 9. In this case, the block number is specified at step d19 by subtracting one from the previous block number. In other words, when the display is performed at step d18, then the program flow goes to step d20 at which a decision is made to determine if the display should be stopped. When it is decided at step d20 that the display should not be stopped, on the one hand, then the program flow goes to step d19 at which the block number is renewed by subtracting one from the previous block number. When it is decided at step d20 that the display should be stopped, on the other hand, then the program flow goes to step d21 for selecting the other function.

Figure 10B:
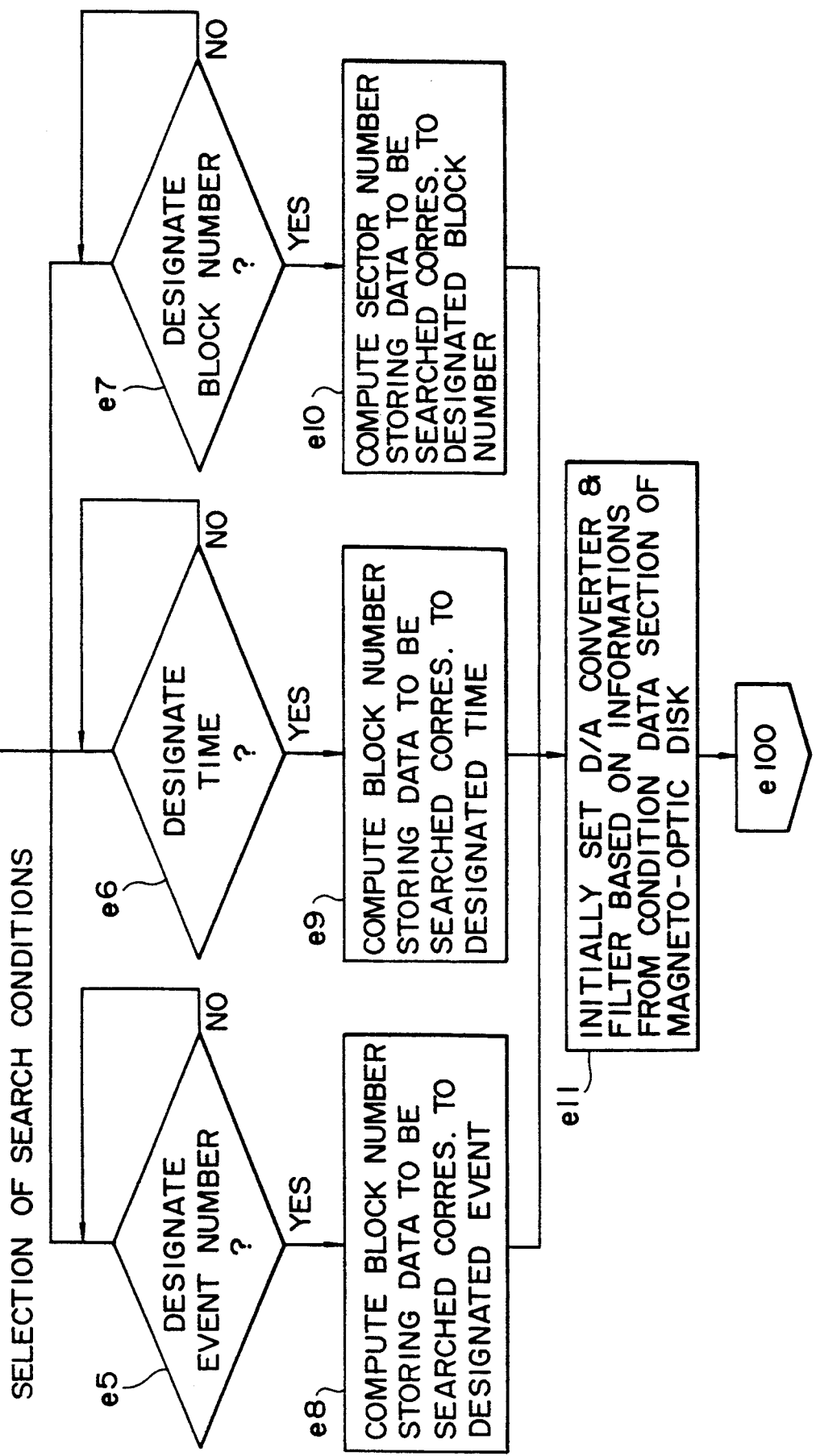

Description will now be made of the operation of searching for and reproducing data with reference to FIG. 10. When the search and reproduction function is selected at step a10 in FIG. 3, it is displayed by the display unit 9 at step e2 of FIG. 10 that the function of searching for and reproducing data has activated and a list of recorded data is displayed on the display unit 9 from the contents of the condition data section of the magneto-optic disk 12 and the input of the searching conditions is required. Then, at step e3, the ID number is entered through the operating panel 10, followed by proceeding to step e4 at which the condition data corresponding to the ID number specified, such as the time to start recording, time to finish recording, sampling speed, a row of event input times, start time, top sector number, and so on are transmitted to the comparative conditions data area set on the RAM 6.

Then, the searching conditions are selected. In other words, the searching conditions are selected by specifying the event number at step e5, the time at step e6 or the block number at step e7. To specify the event number is selected at step e5, then the program flow goes to step e8 at which there is computed the block number of the block in which are stored the data to be searched for, which corresponds to the event specified, from the relationship among the row of the event times, top sector number and sampling speed in the comparative conditions data area on the RAM 6. To specify the time is selected at step e6, the program flow goes to step e9 at which there is computed the block number of the block in which are stored the data to be searched for, which corresponds to the time specified, from the relationship between the top sector number and sampling speed in the comparative conditions data area on the RAM 6. On the other hand, to specify the block number is selected at step e7, then the program flow goes to step e10 at which there is computed the sector number of sector in which are the data to be searched for, which corresponds to the block number specified, from the relationship between the top sector number and sampling speed in the comparative conditions data area on the RAM 6. From the results of computation as described hereinabove, the initial settings of the sampling speed, channel number, filter, cut-off frequency, and so on are implemented in the D/A converter 11a and the lowpass filter 11b for signals at step e11.

Figure 11A:
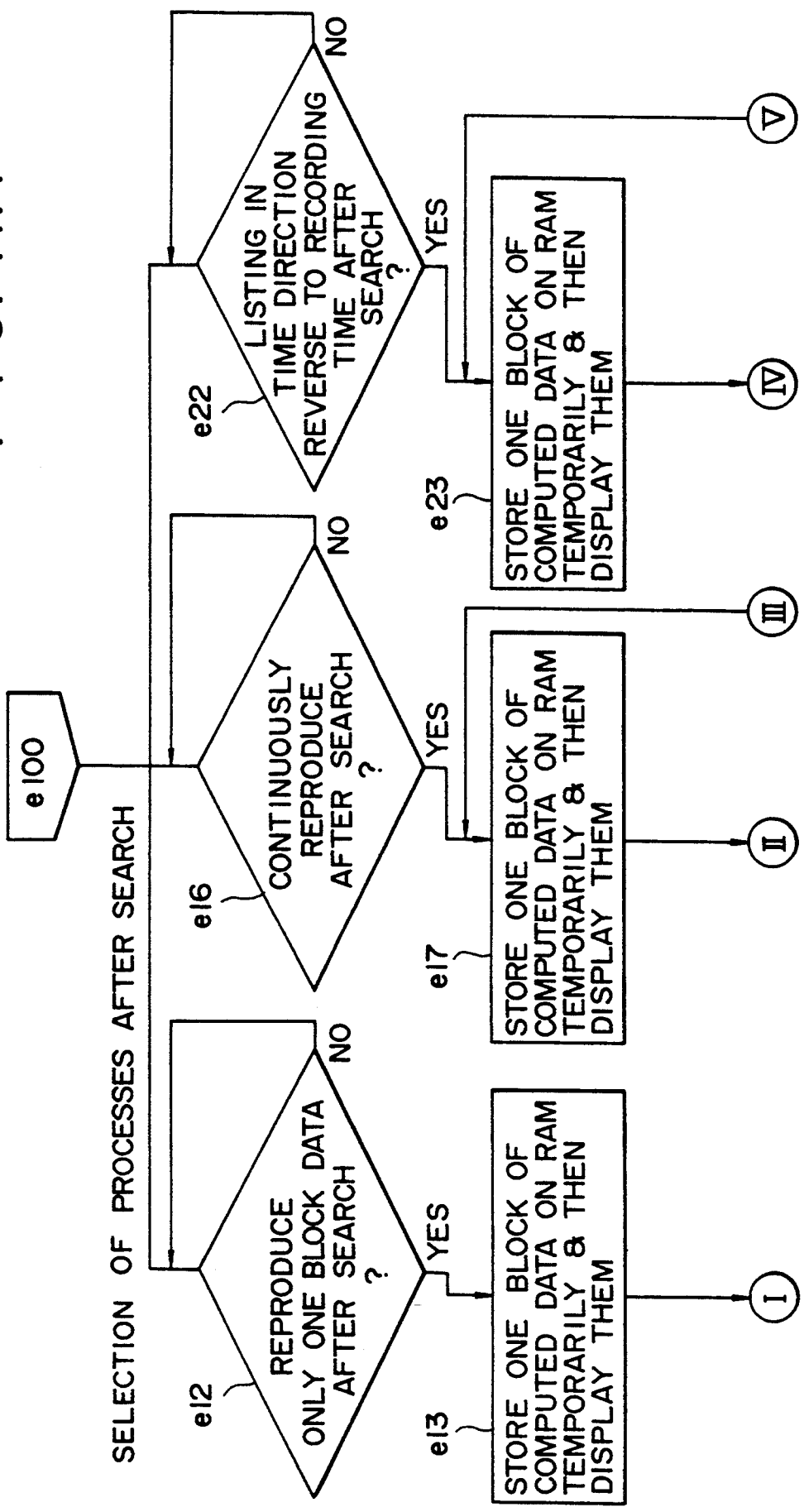

Then, at step e100 of FIG. 11, the kind of processing after searches is selected at step e12, step e16 or step e22. More specifically, when reproduction of one block only is selected at step e12, the program flow goes to step e13 at which one block of data of the block number computed is temporarily stored on the RAM 6 and displayed by the display unit 9, followed by proceeding to step e14 at which the data stored on the RAM 6 is transmitted to the D/A converter 11a to thereby give the corresponding analog signals. Then, at step e15, the resulting analog signals are passed through the lowpass filter 11b, thereby removing unnecessary high frequency components and yielding the signals identical to the original analog signals by an output terminal 11c for generating reproduced analog signals. After step e15, the program flow goes to step e26 at which the other function is to be selected. When continuous reproduction of blocks is selected at step e16, the procedures are taken at steps e17, e18 and e19 in the same manner as reproduction of one block at steps e13 to e15, respectively. In other words, at step e17, one block of data of the block number computed is temporarily stored on the RAM 6 and displayed by the display unit 9, followed by proceeding to step e18 at which the data stored on the RAM 6 are transmitted to the D/A converter 11a to thereby give the corresponding analog signals and then proceeding to step e15 at which the resulting analog signals are passed through the lowpass filter 11b, thereby removing unnecessary high frequency components and yielding the signals identical to the original analog signals by the output terminal 11c for generating reproduced analog signals. After step e19, the program flow goes to step e20 at which a decision is made to determine if the continuous reproduction operation is to be suspended. When the result of decision at step e20 indicates that the continuous reproduction operation should not be suspended, on the one hand, then the program flow goes to step e21 at which the block number is renewed by adding one to the previous block number, i.e. block number+1. When it is decided at step e20 that the continuous reproduction operation should be suspended, on the other hand, then the program flow goes to step e26 for selecting the other function.

On the other hand, when the data is to be searched in the direction opposite to the time recorded at step e22, then the program flow goes to step e23 at which one block of data of the block number computed is temporarily stored and displayed by the display unit 9. In this case, the block number is specified by subtracting one from the previous block number, i.e. block number−1. In other words, after step e23, the program flow goes to step e24 at which a decision is made to determine if the searching operation is to be suspended. When it is decided that the searching operation should not be suspended, on the one hand, then the program flow goes to step e25 at which the block number is renewed by subtracting one from the current block number, followed by proceeding to step e23. When the result of decision at step e24 indicates that the searching operation is to be suspended, on the other hand, then the program flow goes to step e26 for selecting the other function.

Figure 12:
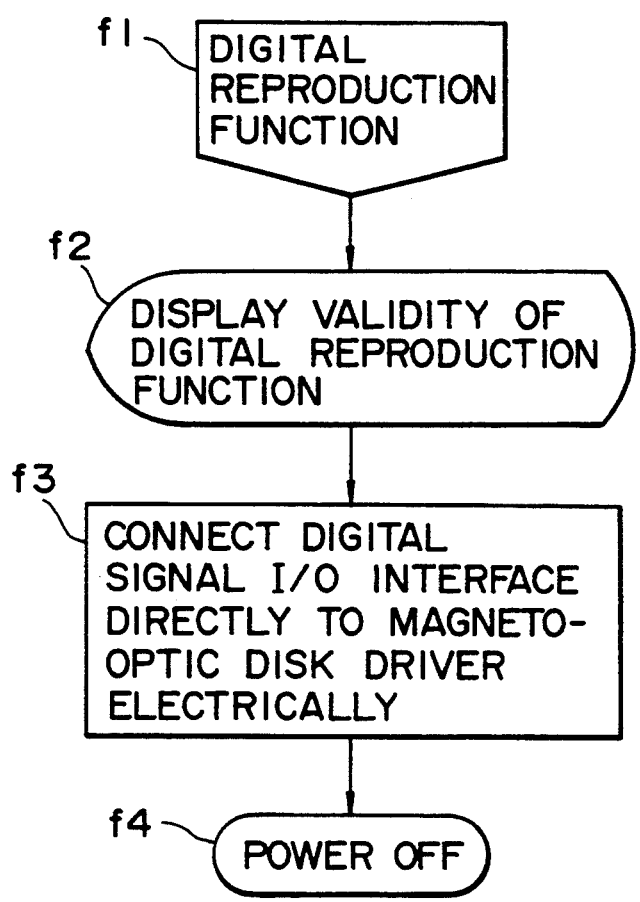
FIG. 12 is a flow chart for digital reproduction.

Finally, description will be made of the digital reproduction function with reference to FIG. 12. When the digital reproduction function is selected at step a11 in FIG. 3, the validity of the digital reproduction function is displayed on the display unit 9 at step f2 in FIG. 12. Then, at step f3, the magneto-optic disk driver 13 is electrically connected directly to the I/O interface 14 on the basis of an instruction from the CPU 5, thereby allowing the magneto-optic disk driver 13 to function as a simple external storage. Hence, the host computer 15 can read all data files (condition data files and record data files) of the magneto-optic disk 12.

As described hereinabove, the data recording system and apparatus of a magneto-optic recording type according to the present invention has the following advantages:

1. Analog signals of multiple channels can be recorded and reproduced. Further, even when data is recorded for an extremely long period of time, the data can be searched for at a high speed for a very short period of time.
2. As the data recorder of the present invention takes advantage of the magneto-optic disk, rewriting of data can be performed without difficulty and a large capacity of data can be recorded. Further, as the head does not come into contact with the magneto-optic disk, no damage is caused against the data files even if the search for and reproduction of data is repeated many times.
3. In addition to ordinary continuous recording, data can be recorded for a given period of time before and/or after the input of a trigger signal.
4. Digital signals that occur periodically in association with the analog signals can be fetched through a communication line, so that digitized analog signals can be simultaneously recorded.
5. Image signals for the status of a data-recording field can be recorded as auxiliary information simultaneously with the digitized analog signals.
6. A high-speed search in various modes can be implemented by recording real-time information, event information, trigger information, etc. in the condition data section of the magneto-optic disk.

What is claimed is:

1. A data recording apparatus of a magneto-optic type, comprising:
   control means for performing control of operation of each section for recording, reproducing and searching for data;
   a program memory for storing a program for operating the control means;
   an operating panel connected to the control means and provided with keys and buttons for entering data, designation and instructions;
   a display unit connected to the control means and arranged to display an operation instruction, an operation status of the apparatus, an input monitor, a reproduction monitor and a search information monitor;
   input terminals for entering analog signals of multiple channels;
   A/D conversion means for converting the analog signals of multiple channels entered from the input terminal into digital signals in time series;
   storage means playing a role as a first temporary storage buffer of analog-to-digital data during recording, as a second temporary storage buffer of digital-to-analog data during reproduction, and as an operation buffer for processing search conditions during a search;
   a magneto-optic disk having a recording data section for storing analog signals digitized by the A/D conversion means and a condition data section as an index for the search in a particular sector;
   a magneto-optic disk driver for writing and reading signals in and from the magneto-optic disk; and
   D/A conversion means for converting signals read from the magneto-optic disk into analog signals.

2. A data recording apparatus of a magneto-optic type according to claim 1, further comprising input means for entering a trigger signal from outside, wherein there are recorded only signals issuing for a predetermined period of time before/and after the point of time of input of the trigger signal.

3. A data recording apparatus of a magneto-optic type according to claim 1, further comprising input means for entering through a communication line, digital signals in time series relating to analog signals to be recorded by digitization, where the analog signals in time series are recorded together with the analog signals digitized.

4. A data recording apparatus of a magneto-optic type according to claim 1, further comprising fetch means for fetching a status of a data recording field as an video signal, wherein the video signal is recorded together with the analog signal to be recorded by digitization.

5. A data recording apparatus of a magneto-optic type according to claim 1, further comprising a real time clock used for a search on the basis of real-time information.

6. A data recording apparatus of a magneto-optic type according to claim 1, further comprising input means for entering event information used for a search on the basis of event information.

* * * * *